L. B. HARVEY.
COMBINATION WHEEL AND RIM.
APPLICATION FILED MAR. 4, 1918.
1,292,601.
Patented Jan. 28, 1919.
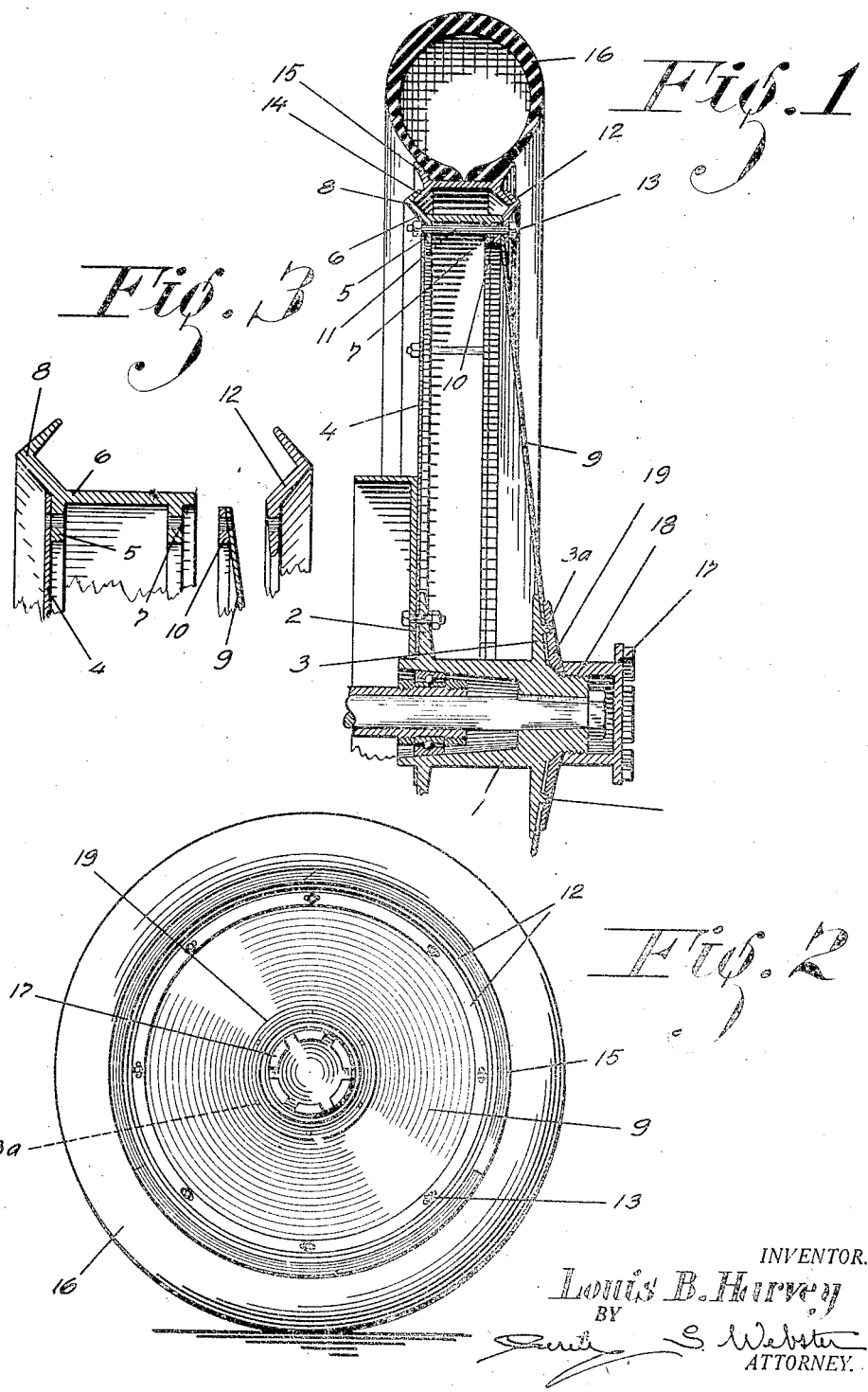
INVENTOR.
Louis B. Harvey
BY
ATTORNEY.

UNITED STATES PATENT OFFICE.

LOUIS B. HARVEY, OF STOCKTON, CALIFORNIA, ASSIGNOR TO INTERLOCKING AUTO RIM COMPANY, OF STOCKTON, CALIFORNIA, A CORPORATION.

COMBINATION WHEEL AND RIM.

1,292,601.  Specification of Letters Patent.  Patented Jan. 28, 1919.

Application filed March 4, 1918. Serial No. 220,161.

*To all whom it may concern:*

Be it known that I, LOUIS B. HARVEY, a citizen of the United States, residing at Stockton, in the county of San Joaquin, State of California, have invented certain new and useful Improvements in Combination Wheels and Rims; and I do declare the following to be a clear, full, and exact description of the same, reference being had to the accompanying drawings, and to the characters of reference marked thereon, which form a part of this application This invention relates to improvements in vehicle wheels and particularly to that type adapted for use on motor vehicles of all kinds.

The object of the invention is to produce a light and attractive and durable solid disk wheel which will eliminate the necessity of the use of wooden spoke or wire wheels, now commonly in vogue. The invention will produce a more attractive and more durable wheel, particularly one more able to withstand side stress or thrust than either the wooden or wire spoke wheels. In addition to this, the wheel will be more easily painted and handled than the spoke wheel and will also hide the running gear underneath the vehicle which is often dirty and disagreeable to look at, especially on the finer grades of pleasure cars.

Also, in combination with the solid disk wheel, I provide a quick demountable tire rim which is held evenly supported for the entire circumference of the wheel when in use, but it can be quickly taken down for changing a tire. A still further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1 is a vertical section through one-half of my improved wheel.

Fig. 2 is a side elevation of the complete wheel.

Fig. 3 is a fragmentary view of the supporting flange, filler ring, disk and removable clamping ring.

Referring now more particularly to the characters of reference on the drawings, the numeral 1 designates the hub of the wheel which is provided with a pair of projecting flanges 2 and 3. Secured to the inner flange 2 is an annular disk 4 which projects outwardly and is secured to a downwardly projecting annular flange 5 on a stationary rim 6, which rim 6 is also provided at a point slightly spaced from its opposite edge with another downwardly projecting flange 7. On its inner edge, the rim 6 is provided with an annular V-shaped supporting flange 8. The disk 4 extends in a vertical plane so as to allow the wheel to set in close to the running gear of the standard motor vehicle. To lend appearance and strength to the wheel, and also to allow the same to fit on the present standard axle, the outer disk 9 is removably connected to the outer flange 3 by means of dowel pins 3ª and inclines slightly inwardly so as to give a full flared appearance to the outer face of the wheel. Along the outer edge of the disk 9, on the inside surface thereof, is a filler ring 10 which fills in the space between the flange 7 and the outer edge of the rim 6 and forms the supporting seat for the outer edge of such rim 6. Bolts 11 project through the disk 4, the flanges 5 and 7, filler ring 10 and disk 9. A removable V-shaped clamping ring 12 is provided with orifices adapted to take over the bolts 11 and to be bolted firmly against the outer edge of the disk 9 by means of nuts 13. The V-shaped clamps 8 and 12 receive and support flanges 14 on the demountable rim 15 carrying the tire 16. When the clamp 12 is in position and secured by means of the nuts 13, this also firmly binds the disks and stationary rim together. When the nuts 13 are removed, however, the clamp 12 may be taken off and the demountable rim 15 readily removed.

When it is desired to entirely disassemble the wheel for any purpose, the hub cap 17 is removed from the threaded portion 18 of the hub and this permits the removal of a clamping washer 19 which holds the disk 9 in position against the flange 3, thereupon the disk 9 may be removed.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention as defined by the appended claim.

Having thus described my invention, what I claim as new and useful and desire to secure by Letters Patent is:—

A combination wheel and rim comprising a hub, side disks mounted to the hub, a permanent rim mounted at the outer periphery of the disks, a V-shaped flange extending upwardly from the rim having the apex thereof projecting outwardly, a removable supporting ring on the rim having a V-shaped portion oppositely disposed to the V-shaped flange, removable bolts through said rim and ring, and a demountable rim adapted to carry a tire having outwardly flaring flanges thereon adapted to seat in the apexes of the V-shaped flange and rim whereby the pressure on the demountable rim will be transmitted radially through the flange, removable ring and disks and not through the bolts.

In testimony whereof I affix my signature in presence of two witnesses.

LOUIS B. HARVEY.

Witnesses:
 VERADINE WARNER,
 BERNARD PRIVAT.